(12) United States Patent
van Greunen et al.

(10) Patent No.: US 8,451,739 B2
(45) Date of Patent: May 28, 2013

(54) METHOD AND SYSTEM FOR DETECTING FAILURES OF NETWORK NODES

(75) Inventors: Jana van Greunen, Redwood City, CA (US); William E. San Filippo, III, Los Altos Hills, CA (US); Jay Ramasastry, Reno, NV (US); Kunal Pankaj Shah, Santa Clara, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 382 days.

(21) Appl. No.: 12/760,826

(22) Filed: Apr. 15, 2010

(65) Prior Publication Data

US 2011/0255418 A1  Oct. 20, 2011

(51) Int. Cl.
*H04L 12/26* (2006.01)
(52) U.S. Cl.
USPC .......................... 370/242; 370/248; 370/250
(58) Field of Classification Search
None
See application file for complete search history.

(56) References Cited

U.S. PATENT DOCUMENTS

| | | | |
|---|---|---|---|
| 2002/0133733 A1* | 9/2002 | Abdel-Ghaffar | 713/500 |
| 2003/0163729 A1* | 8/2003 | Buchegger | 713/201 |
| 2004/0044929 A1* | 3/2004 | Chujo | 714/47 |
| 2009/0180388 A1* | 7/2009 | Verchere et al. | 370/238 |
| 2009/0253453 A1* | 10/2009 | Zhang et al. | 455/522 |
| 2011/0264956 A1* | 10/2011 | Ito et al. | 714/20 |
| 2012/0030323 A1* | 2/2012 | Matsuno | 709/221 |

* cited by examiner

*Primary Examiner* — Chi Pham
*Assistant Examiner* — Soon-Dong D Hyun
(74) *Attorney, Agent, or Firm* — Buchanan Ingersoll & Rooney PC (57) ABSTRACT

Systems and methods for detecting device failures in a network having nodes coupled to a central controller, in which a first of the nodes communicates with the central controller via a second of the nodes. When the second node determines that the first node has not transmitted a predetermined number of messages over a predefined number of time periods, the second node provides a failure alert to the central controller. The central controller records a failure alert received from the second node in a log. Based on a set of failure alerts received from a number of nodes recorded in the log, the central controller determines whether the first node has failed.

44 Claims, 7 Drawing Sheets

| NODE 111A ALERTS | | | | | | | | | | |
|---|---|---|---|---|---|---|---|---|---|---|
| Nbr. | 1 | 2 | 3 | 4 | 5 | 6 | 7 | 8 | 9 | 10 |
| 111B | | | | | | | | | | | ... |
| 110C | | | | | A | | | A | A | A | ... |
| 111C | | | | | | | | | | | ... |

353

| NODE 111B ALERTS | | | | | | | | | | |
|---|---|---|---|---|---|---|---|---|---|---|
| Nbr. | 1 | 2 | 3 | 4 | 5 | 6 | 7 | 8 | 9 | 10 |
| 111A | | | | | | | | | | | ... |
| 110A | | | | | A | A | A | A | A | A | ... |
| 110D | | | | | | A | A | A | A | | ... |
| 111C | | | | | | A | A | A | A | A | ... |

355

| NODE 111C ALERTS | | | | | | | | | | |
|---|---|---|---|---|---|---|---|---|---|---|
| Nbr. | 1 | 2 | 3 | 4 | 5 | 6 | 7 | 8 | 9 | 10 |
| 111A | | | | | | | | | | | ... |
| 111B | | | | | | | | | | | ... |
| 110C | | | | | A | A | A | A | A | A | ... |
| 110G | | | | A | A | A | A | A | A | A | ... |
| 110F | | | | | | A | A | A | A | A | ... |

357

| NODE 110A ALERTS | | | | | | | | | | |
|---|---|---|---|---|---|---|---|---|---|---|
| Nbr. | 1 | 2 | 3 | 4 | 5 | 6 | 7 | 8 | 9 | 10 |
| 111B | | | | | | A | | | | | ... |
| 110B | | | | | | | | | | | ... |
| 110C | | | | | | | | | | | ... |
| 110D | | | | | | | | | | | ... |
| 110E | | | | | | | | | | | ... |

METHOD AND SYSTEM FOR DETECTING FAILURES OF NETWORK NODES

FIELD

The disclosed embodiments are directed toward network error and fault handling.

BACKGROUND

It is necessary for the operators of communication networks to remotely detect when devices fail within their networks. Very large networks, such as those used by utility services, cannot be effectively monitored by actively polling devices due to limitations the size of these networks place on bandwidth, transmission time and power. In addition, failures caused by, for example, power loss are difficult to predict and identify.

SUMMARY

Embodiments disclosed herein provide systems and methods for detecting device failures in a network having nodes coupled to a central controller, in which a first one of the nodes communicates with the central controller via a second one of the nodes. When the second node determines that the first node has not transmitted a predetermined number of messages over a predefined number of periods, the second node provides a failure alert to the central controller. The central controller records the failure alert received from the second node in a log. Based on a set of failure alerts received from a number of nodes recorded in the log, the central controller determines whether the first node has failed. When it is determined that the first node has failed, the central controller can generate a failure notification that causes a notification device to indicate a failure.

DETAILED DESCRIPTION

Figure 1:
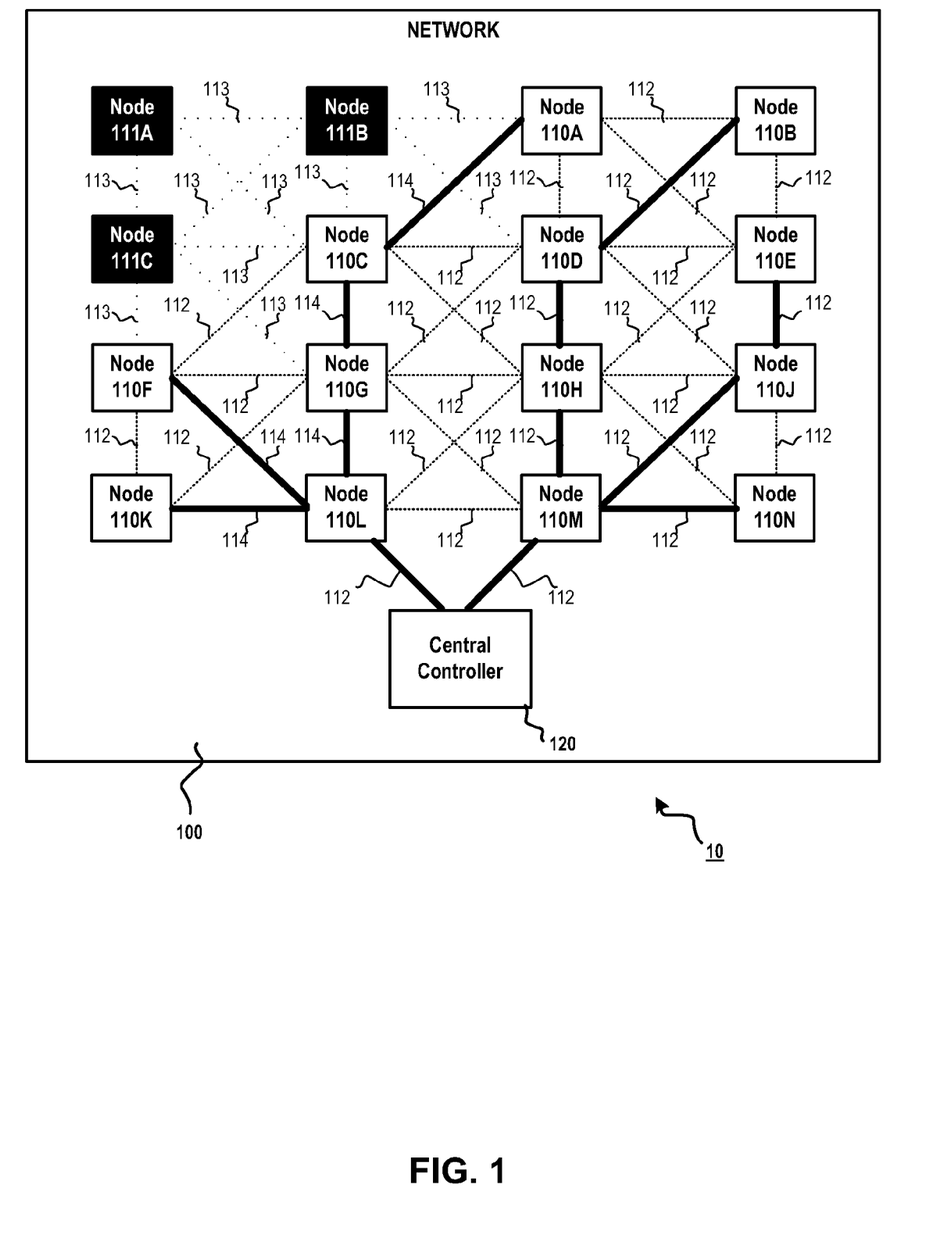
FIG. 1 is a block diagram illustrating an exemplary network system including a number of nodes.

FIG. 1 is a block diagram illustrating an exemplary system 10 including a network 100 having a plurality of nodes 110A-N communicatively coupled by links 112 to a central controller 120. In addition, nodes 110 include failed nodes 111A-C that have become uncoupled from network 100, as illustrated by failed links 113. As used in this disclosure, the term "coupled" refers to any direct or indirect communication between two or more elements, whether or not those elements are in physical contact with one another.

Network 100 may be any type of network including, for instance, a cable television network, satellite communications network, sensor network, or an ad-hoc wireless communications network. Network 100 can also be connected to another network, contain one or more other sub-networks, and/or be a sub-network within another network. The network illustrated in FIG. 1 is a simplified example having only a small number of generic nodes 110. However, other networks having different numbers and types of components (e.g., nodes) in different configurations may benefit from embodiments of this disclosure.

Nodes 110A-N (collectively referred to as nodes 110) can be any programmable data processing devices coupled to network 100. A node 110 can be, for example, a general-purpose computer, server, a network device (e.g., gateway, terminal, switch, repeater, router), application-specific device (e.g., residential utility meter, remote sensor, set-top box, game device, mobile telephone); or a home appliance (e.g., refrigerator, dishwasher). In some embodiments, node 110 may be an embedded system in which some or all of the illustrated components are integrated into a single component (e.g., an application-specific integrated circuit).

Communications links 112 couple nodes 110 and central controller 120 in network 100. Communication links 112 can be wired, fixed wireless, or mobile wireless links using a variety of communication protocols. For instance, information can be transmitted over communications links 112 within data packets according to packet-switching protocols, such as Transaction Control Protocol (TCP)/Internet Protocol (IP), X.35, and Frame Relay.

Failed nodes 111A-C are nodes 110 that have uncoupled from network 100. For instance, failed node 111C may have stopped communicating with other nodes in network 100 due to the following reasons: damage, tampering, hardware failure, software corruption, power-loss, relocation, electromagnetic interference, physical obstruction, and/or network traffic. When a node 110 stops communicating with network 100 (becoming a failed node 111), the node's communication links 112 that couple it to network 100 are broken, as illustrated in FIG. 1 by failed links 113.

It should be recognized that FIG. 1 illustrates network 100 at an exemplary point in time when nodes 111A-C have become uncoupled from their respective neighboring nodes 110. The uncoupling may be temporary and failed nodes 111 are not necessarily uncoupled at other times. For instance, a temporary decoupling may occur when a drop in a node 111C's power supply causes it to miss scheduled communications with its neighboring node 110 for several minutes. In such cases, as described in detail below, neighboring nodes log the missed communications and, based on the log over several periods, provide failure alerts to central controller 120.

In an exemplary embodiment illustrated in FIG. 1, network 100 is a wireless grid network in which nodes 110 establish communication links 112 with their respective neighboring nodes 110 that are within communication range. Nodes 110 can exchange information with other nodes that reside outside of their transmission range by relaying the information over communication links 112 between a combination of intervening nodes and, in some instances, a combination of networks. The grid network illustrated in FIG. 1 can be, for example, a smart-grid network that monitors and controls an electrical power generation and distribution service. For instance, nodes 110 in this exemplary embodiment may transmit information recorded by residential utility meters to central controller 120, which is a back-office server, by relaying the information through node 110M. In some cases, node 110M may be a network access point (i.e., gateway) that aggregates information from several of nodes 110 and forwards the information to central controller 120 over a second network (e.g., the Internet).

Figure 2A:
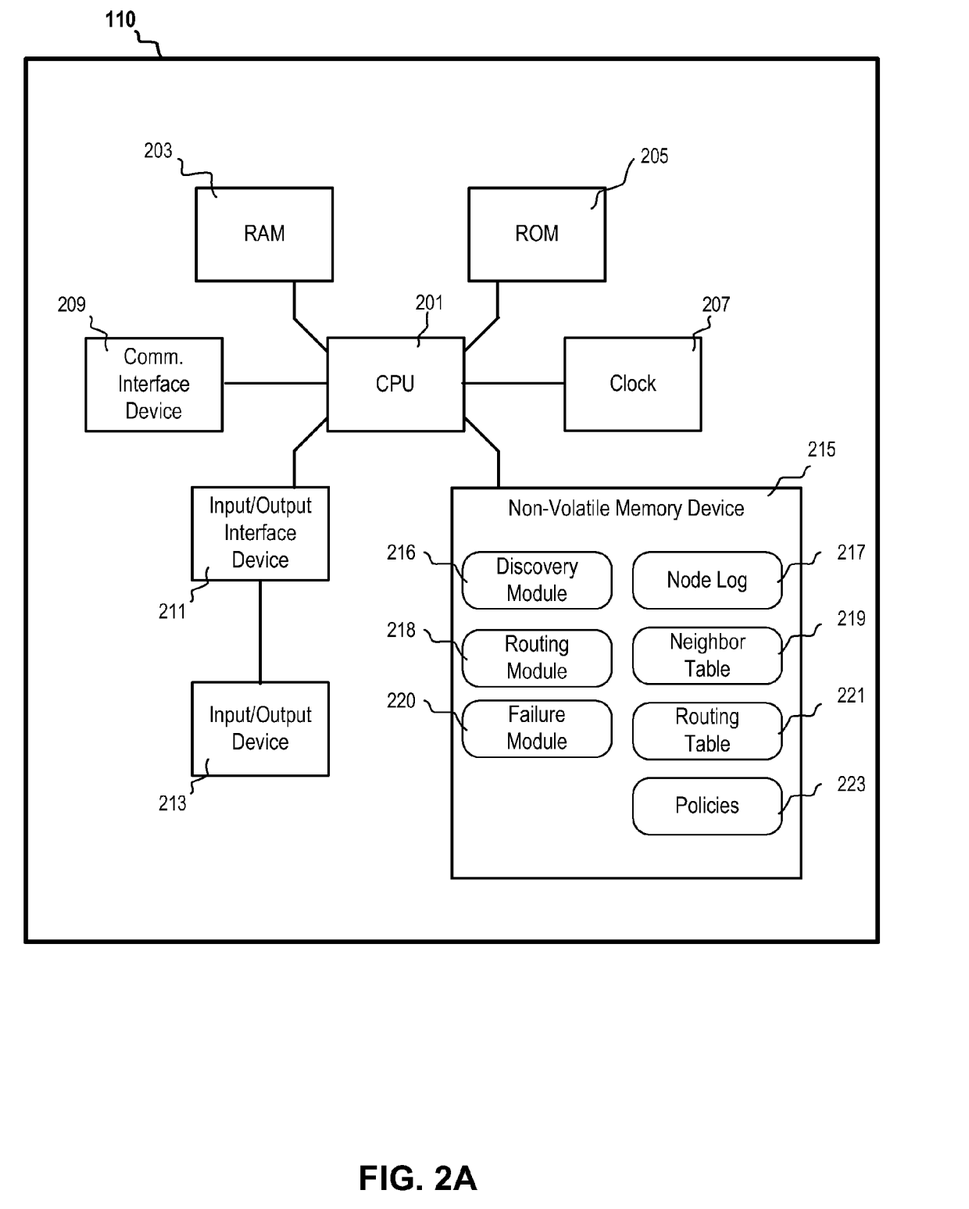
FIG. 2A is a block diagram illustrating an exemplary node in the system.

FIG. 2A is a block diagram illustrating an exemplary node 110. Node 110 may have a central processing unit ("CPU") 201 coupled to a random access memory ("RAM") 203, a read-only memory ("ROM") 205, a clock 207, a communication interface 209, input/output interface device 211, input/output device 213, and a non-volatile memory device 215. While not illustrated, node 110 may include other devices, such as power supplies, input/output devices, interface devices, user-input devices, sensors, antennas, data buses, graphic processors, displays and audio transducers. Node 110 may also include a positioning device, such as one that uses the Global Positioning System ("GPS").

CPU 201 is an electronic data processing device that executes program instructions recorded in computer-readable memory devices, including RAM 203, ROM 205 and/or non-volatile memory device 215. CPU 201 may be a general-purpose processor (e.g., INTEL), or a specialized, embedded processor (e.g., ARM). Although FIG. 2A depicts nodes 110 as a single processing device, node 110 may have multiple processors, a processor array, or any other suitable processor or processors.

Communication interface device 209 may include any hardware (e.g., modem, network, interface card, etc.), software (e.g., multi-layer protocol support, protocol conversion, data processing, data modulation, etc.), firmware, or combination thereof operable to facilitate communication with one or more elements external to node 110. For example, communication interface device 209 exchanges information with other nodes to encode and decode messages transmitted over communication link 112.

Data input/output device 213 may be one or more devices that are coupled with CPU 201 via input output interface device 211. Output interface device 211 can communicate data using one or more analog, serial, parallel or network communication protocols. Data input/output device 213 can be incorporated-in or peripheral-to node 110. Data input/output device 213 can include, for example, a user input device (e.g., a computer mouse), a notification device (e.g., an audiovisual alarm), a display device (e.g., a video display), an audio device (e.g. a speaker), a sensor (e.g., a thermocouple), a data-capture device (e.g., a digital input/output card) and a communication device (e.g., a modem).

Non-volatile memory device 215 may include any hardware, software, firmware, or combination thereof operable to store and to retrieve information, including computer-readable program instructions and data. Non-volatile memory device 215 may be, for instance, a semiconductor, magnetic or optical-based information storage/retrieval device (e.g., flash memory, hard disk drive, CD-ROM, flash RAM). Although memory device 215 is depicted as a single component, memory device 215 may comprise any additional number of storage devices. In addition, all of memory device 215 could reside locally within node 110 or a part could reside in a location that is outside of nodes 110.

Node 110 may store program modules comprised of computer-executable instructions stored in for example, ROM 205, RAM 203 or memory device 215. Program modules may include discovery module 216, routing module 218 and failure module 220. These program modules may be, for example, software, firmware, code, portions of code, data compilations, and/or a combination of these or any other type of information.

Discovery module 216, when executed by CPU 201, causes node 110 to discover its neighboring nodes in network 100 and keep a log of whether other nodes are communicating with the network. A "neighboring node" is a node that is directly coupled to another node without any intervening nodes. For instance, in FIG. 1, node 110B is neighbored by nodes 110A, 110D and 110E. A node 110 may discover neighboring nodes by, for example, broadcasting discovery messages and listening for nodes that reply to the broadcast. In addition, node 110 may determine neighbors by interrogating other nodes 110 and/or central controller, which might hold such information in their respective neighbor tables.

Figure 3A:
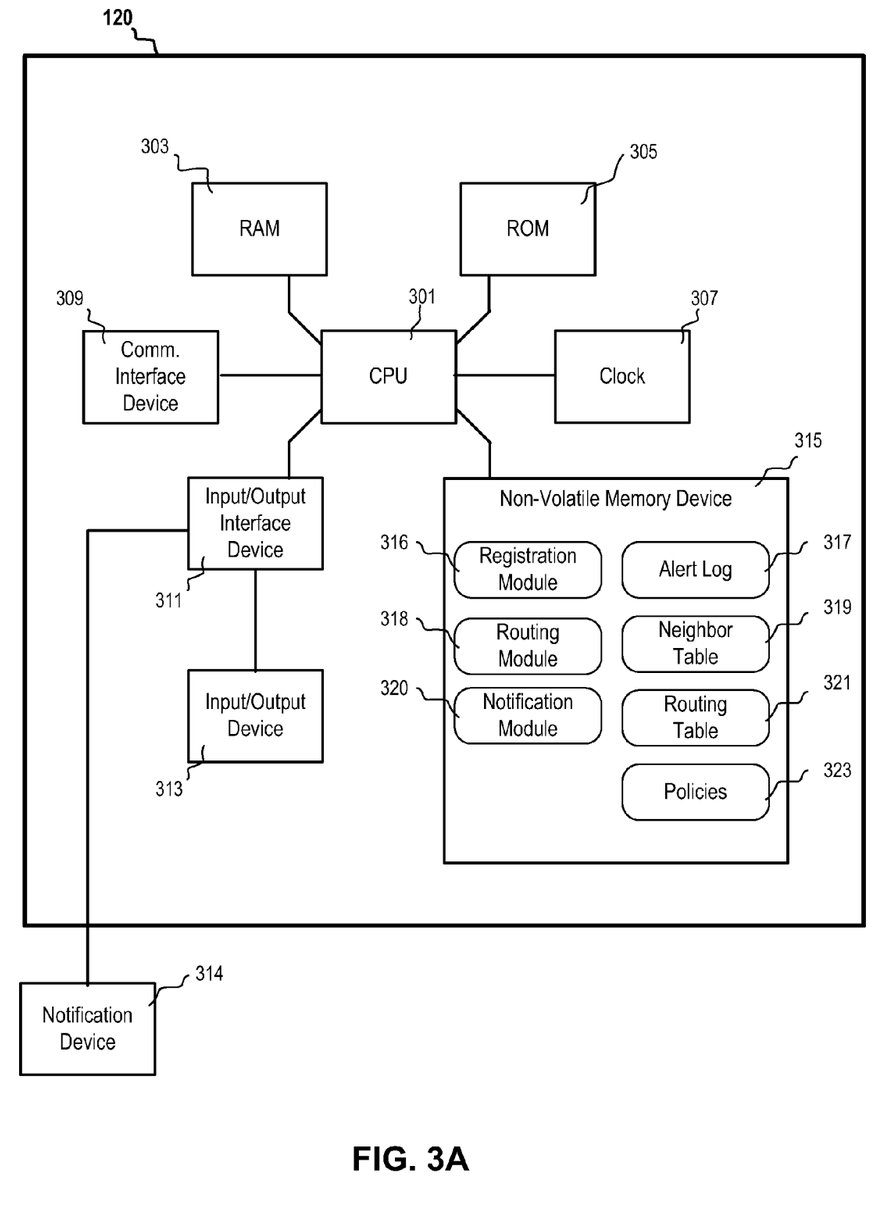
FIG. 3A is a block diagram illustrating an exemplary central controller in the system.

Discovery module 216 may store information describing node 110's neighbors in neighbor table 219. Node 110 may keep its neighbor table 219 updated based on regular communications with the other nodes. For example, the regular communication may be a periodic beacon (e.g., "heartbeat") that is broadcast by some or all of nodes 110. Alternatively or additionally, the regular communications may be periodic "keep-alive" messages that are targeted to particular nodes. The regular communications can also be used by nodes 110 for other purposes, such as verifying nodes' authenticity, synchronizing, monitoring network conditions, and updating route path information. As discussed below, these regular communications may be logged by neighboring nodes and used to determine whether to send failure alerts to central controller 120. Nodes 110 may send their respective neighbor table 219 information to central controller 120 for inclusion in a central neighbor table 319 (FIG. 3A). This registration process can, for example, allow the central controller 120 to add the registering node to its routing table 321 and insure that the status of the node is up to date.

In some embodiments, only nodes that are "upstream" from a neighbor add the registering downstream neighbor to their neighbor table 219 (and routing table 221). In the context of network 100, a node is "upstream" with respect to another node if it is on a routing path between central controller 120 and the other node. Exemplary routing paths 114 between nodes 110 and central controller 120 are illustrated in FIG. 1 by heavy, solid lines. Routing paths 114 can be determined based on link costs and route costs. Link cost may be determined, for example, based on the success rate for a neighboring node to transmit a message of a particular size. Route costs are a neighboring node's advertised cost of egress from network 100 to central controller 120. Since routing paths 114 take into account link costs and route costs, a node is not necessarily "upstream" when it resides closer to central controller 120.

Routing module 218, when executed by CPU 201, causes node 110 to generate and/or update routing table 221. Routing table 221 identifies paths by which node 110 sends communications out of network 100, for example, to central controller 120. Node 110 determines information for routing table 221 based on link costs and the route costs. A node 110 may use information from routing table 221 and neighbor table 219 to select and apply one or more predetermined policies 223 for generating failure alerts.

Failure module 220, when executed by CPU 201, causes node 110 to determine and report whether a neighboring node 110 is a failed node 111 based on policies 223. Policies 223 are used by failure module 220 to determine whether nodes 110 should send a failure alert to central controller 120. In determining whether to provide a failure alert, failure module 220 may reference information stored in log 217, neighbor table 219 and/or routing table 221. Policies 223 may define a period window over which failures can be determined. In addition, policies 223 may define a number or percentage of missed messages over the defined period (e.g., a time-moving average). Additionally, policies 223 may establish a total number or percentage messages that may be missed before a failure alert is issued.

Node 110 may also include a positioning module (not shown) that, when executed by CPU 201, determines the location of the node and/or reports the node's location to the central controller 120. Node 110 may report its location when the node registers with network 100, when the node issues a failure alert, and/or periodically. The location of node 110 may be a static value or node 110 may determine its position periodically. For example, the location of node 110 may be a mailing address or geographic coordinates. Positioning module may determine node 110's location using various methods. In some instances, node 110's location is determined by a technician and stored in non-volatile memory device 215 when the node is installed. In other instances, the node may determine its location using a positioning device, such as a GPS receiver or the like. The location of node 110 may also be determined based on the location of another node or element of network 100. For instance, the location may be derived to a known position for a transformer of a power distribution network or cellular network relay tower in a telecommunications network.

Node 110 may store a number of policies 223 that can be dynamically selected by failure module 220 based on conditions in network 100. Network conditions can include, for example, topology, link costs, route costs, interference (e.g., bit-error-rates), network congestion (e.g., dropped packets). Different policies 223 may determine whether a particular node 110 provides a failure alert to central controller 120 based on data in log 217.

In an example, one of policies 223 may allow any node 110 neighboring a failed node 111 to provide a failure alert to central controller 120. In another case, this policy may require that, based on information retrieved from neighbor table 219 and/or routing table 221, only nodes 110 neighboring a failed node 111, lie along a routing path 114, and/or are upstream, may send a failure alert to central controller 120. In yet another case, the policy may require that node 110 provide a failure alert of a failed neighbor only if it is on the lowest-cost routing path 114 between the failed node 111 and central controller 120. In large, dense networks, limiting the number of nodes that provide failure alerts can improve network performance by reducing network traffic, by culling the number of nodes 110 that transmit failure alerts.

Additionally, policies 223 may include one or more policies for removing "dead nodes." That is, in the circumstance in which a failed node 111 satisfies certain conditions, the failed node may be declared "dead" by node 110. In this circumstance, node 110 may presume that the failure of node 111 is permanent and, accordingly, stop listening for the failed node 111. Also, node 110 may remove the dead node from node log 217, neighbor table 219 and routing table 221. By doing so, failed nodes 111 that are broken or removed can be automatically deprecated from network 100. In the event that a dead node is revived, the revived node can be added by discovery module 216 in the same manner as used to add a new node. In some instances, node 111A may be declared dead by node 110C in response to a message from central controller 120 indicating that node is dead. Node 110C may also declare failed node 111A dead if the failure alerts generated by node 110C regarding failed node 111A exceed a threshold, such as a number of alerts over a period of time and/or a number of consecutive alerts.

Figure 2B:
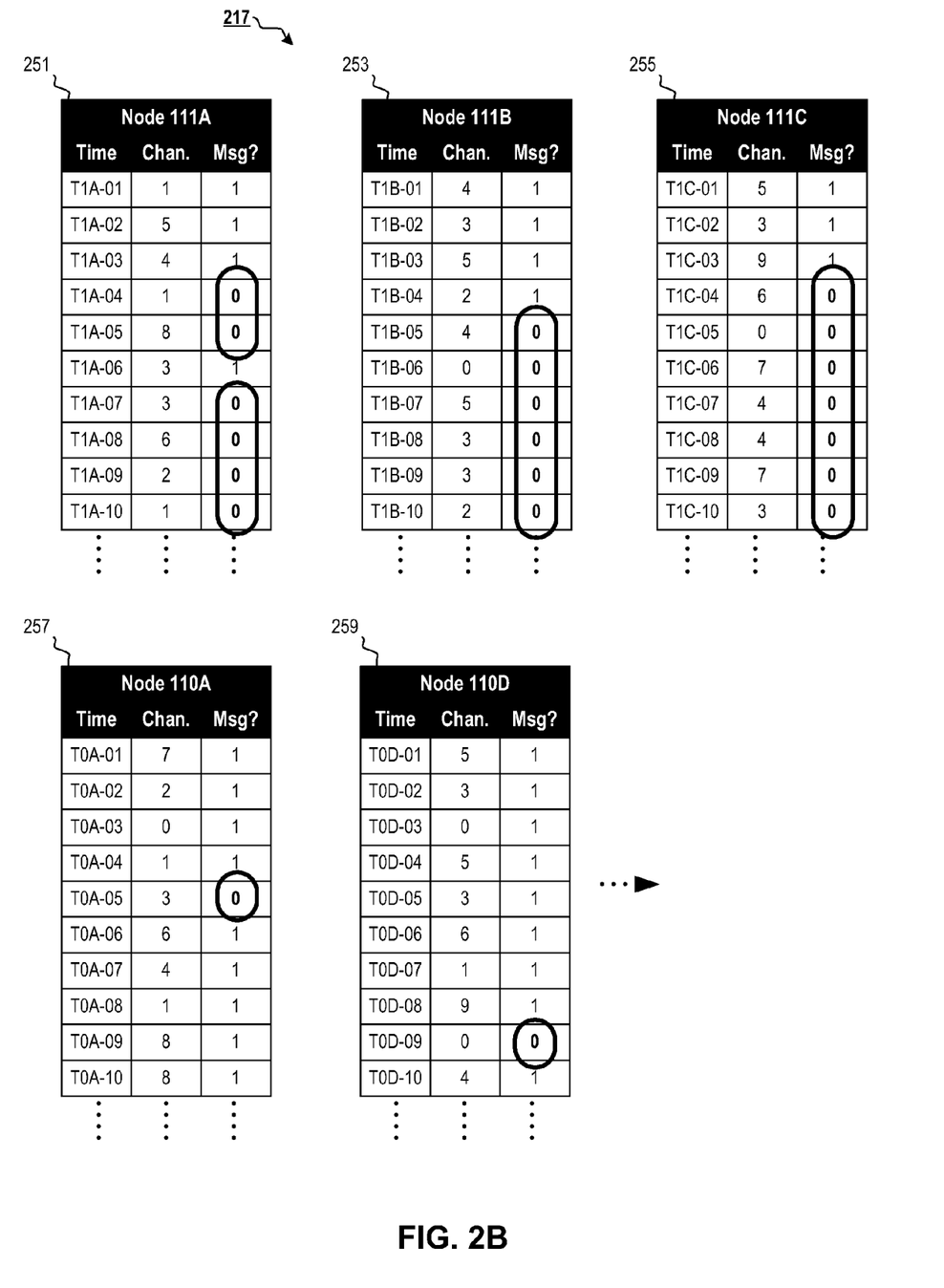
FIG. 2B illustrates an exemplary data structure used in the node.

FIG. 2B illustrates a portion of an exemplary node log 217 that stores information of whether messages were received by a node 110 from the nodes' respective neighbors in association with a time the message was received. For the sake of example, FIG. 2B represents the log of messages that could be stored by node 110C from its neighboring nodes 111A, 111B, 111C, 110A and 1110D (neighboring nodes 110F, 110G, 110H not shown in the log for the sake of brevity). As illustrated, log 217 may include a time period that a message was expected by node 110 to be received (or sent) from the neighbor, the channel (i.e., frequency) on which the message was to be transmitted, and/or whether or not a message was received (e.g., where "1" means received and "0" means not-received). The period may be the time range over which node 110 listens for messages from a neighboring node. This time range may be based on a regular communication between neighboring nodes; based on a periodic beacon transmitted by the neighbor; or based on time range announced by the neighbor node during asynchronous communications.

In one example, nodes 110 communicate using a spread-spectrum, frequency-hopping protocol. A node, such as node 110A, will communicate that it will transmit a message at a scheduled time and frequency. Because each node may communicate asynchronously, the time period at which a message is received from one node may not be the same period a different message is received at another node. For instance, node 111A may periodically transmit messages to send its neighbors updated communication parameters or a routing path. The neighboring nodes, such as node 110C, will listen for the message from node 111A. Node 110C records receipt and/or non-receipt of the message from node 111A in log 217. Based on log 217, node 110C may determine whether to send a failure alert to central controller 120.

The arrangement of log 217 in FIG. 2B is simplified for purposes of providing an example. It is not required that the information in log 217 be organized in tables, as shown in FIG. 2B. For example, the information could be stored as flat files, as linked tables or as individual records, etc. In addition, the log could include more or less information. In some embodiments, for instance, log 217 could store additional information about nodes 111A, 111B, 111C, 110A and 1110D, as well information about some nodes 110 that may be received via other nodes. In other embodiments, node 110C may simply store a running count of how many messages were missed in a row.

Table 251 is an exemplary log generated about node 110C's neighboring node 111A. The table indicates that messages were received by node 110C from node 111A in the periods T1A-01 to T1A-03 and T1A-06. However, in periods T1A-04 to T1A-05 and T1A-07 to T1A-10, no messages were received. In addition, table 253 indicates that messages were received by node 110C from node 111B in the period between T1B-01 and T1B-4, but no messages were received in the period between T1B-05 and T1B-10. Based on this information, node 110C may or may not send a failure alert message to central controller 120 based on policies 223 stored in memory device 215.

As noted above, one of the stored policies 223 may be dynamically selected by node 110 based on current network conditions and/or a command by central controller 120. The selected policy may define rules for determining whether to provide a failure alert based on whether a predetermined number of messages have been received from another node 110 (or node 111) over a predefined number of time periods.

For the sake of example, assume that a selected one of policies 223 require at least three of the most recent five expected messages to be missed before node 110 sends a failure alert to central controller 120. With reference to table 251 at time T1A-05, node 110 would not send a failure alert since only two out of five messages were not received. Such cases might be allowed to pass without an alert to intentionally overlook short-term failures, such as temporary spikes in interference or brief power drops in a portion of network 100. However, in between times T1A-04 to T1A-08, node 110C would send a failure alert since four of five messages have not been received. Node 110C may continue to send failure alerts for each of the subsequent periods between times T1A-05 to T1A-09 and T1A-06 to T1A-10.

FIG. 3A is a block diagram illustrating an exemplary central controller 120. Central controller 120 may include hardware, software, firmware, or combination thereof capable of processing at least a portion of programs stored thereon. As shown in FIG. 3A, central controller 120 may include a CPU 301 coupled to a RAM 303, a ROM 305, a clock 307, a communication interface 309, input/output interface device 311, input/output device 313, and a non-volatile memory device 315. These components are similar to the components included in node 110, the descriptions of which are already provided above.

CPU 301 may execute program modules comprised of instructions stored in computer-readable memory (e.g., ROM 305, RAM 303 or memory device 315) that cause central controller 120 to perform functions disclosed herein. The programs may include, for example, software, firmware, code, portions of code, data compilations, and/or a combination of these or any other type of information.

Registration module 316, when executed by CPU 301, causes central controller 120 to receive and store neighbor information from nodes 110. Using the received neighbor information, central controller 120 may create and/or modify central neighbor table 319 that, by identifying the relationships between coupled nodes, reflect the topology of network 100. Registration module 316 may also store other information about nodes in network 100 that describes, for example, a type of device (e.g., appliance, utility meter, transformer, and substation) and a position corresponding to the respective nodes.

Routing module 318, when executed by CPU 301, causes central controller 120 to determine routing paths 114 that nodes 110 may use to communicate information from network 100 based on neighbor table 319. In some embodiments, central controller 120 may distribute the predetermined routing paths 114 to nodes 110 to manage network performance.

Notification module 320, when executed by CPU 301, causes central controller 120 to determine whether a neighboring node 110 is a failed node 111 based on notification policies 323. Policies 323 are used by notification module 320 to determine whether central controller should generate a failure report. In determining whether to provide a failure report, rules may reference information stored in alert log 317, neighbor table 319 and/or routing table 321. Policies 323 may define a period window over which notifications can be determined. Policies may define a percentage of failure reports from a predetermined number of nodes over a predefined period (e.g., a time-moving average). In other cases, the policy may simply be an absolute percentage.

Central controller 120 may also include a failure isolation module (not shown) that, when executed by CPU 301, determines the location of one or more failed nodes 111 based on failure alerts received from nodes 110, stored topology information for network 100 and/or stored location information of the nodes in network 100. For example, in a network operated by a utility service provider, failed nodes 111 may be faulty components of a power grid. Central controller 120 may determine that a group of failed nodes 111 includes a power transformer and, based on the network topology information and/or stored node location information, determine whether any nodes connected to the transformer have also failed. In this way, a utility service provider may isolate the location where the failure has occurred and identify the source of a failure.

Policies 323 may include several sets of predefined rules that can be dynamically selected by notification module 320 based on network conditions. Network conditions can include, for example, topology, interference (e.g., bit-error-rates), network congestions (e.g., dropped packets). The policy may control whether central controller generates a failure report to cause a notification device 314 to display a failure indication.

Additionally, policies 323 may include policies for issuing an report indicating locations of failed nodes 111 determined by the failure isolation module. That is, the failure isolation module may determine whether to report the location of one or more failed nodes 111 based on a policy that defines one or more limitations for reporting the location of a failed node 111. Such a policy may require the location or region of failed nodes 111 be known to a threshold of confidence before central controller 120 issues a failure location report.

Moreover, policies 323 may include one or more policies for removing "dead nodes." In a circumstance in which a failed node 111 satisfies certain conditions, the failed node may be declared "dead" by central controller 120. Central controller 120 may then issue a "dead node" message to nodes 110 and remove records related to the dead node from, for example, alert log 317, neighbor table 319 and/or routing table 321. By declaring a failed node 111 dead, nodes that are broken or uninstalled from network 100 may be automatically deprecated from network 100. In the event that a dead node is revived, the revived node can be added by registration module 316 in the same manner as a new node.

In some instances, central controller 120 determine that a failed node, such as failed node 111A, is dead based on a rule stored in policies 323. Central controller 120 may determine failed node 111A dead if the failure alerts received from nodes 110 and stored in alert log 317 exceed a threshold. For instance, central controller 120 may determine that failed node 111A is dead based on a number of alerts over a period of time and/or a number of consecutive alerts.

Figure 3B:
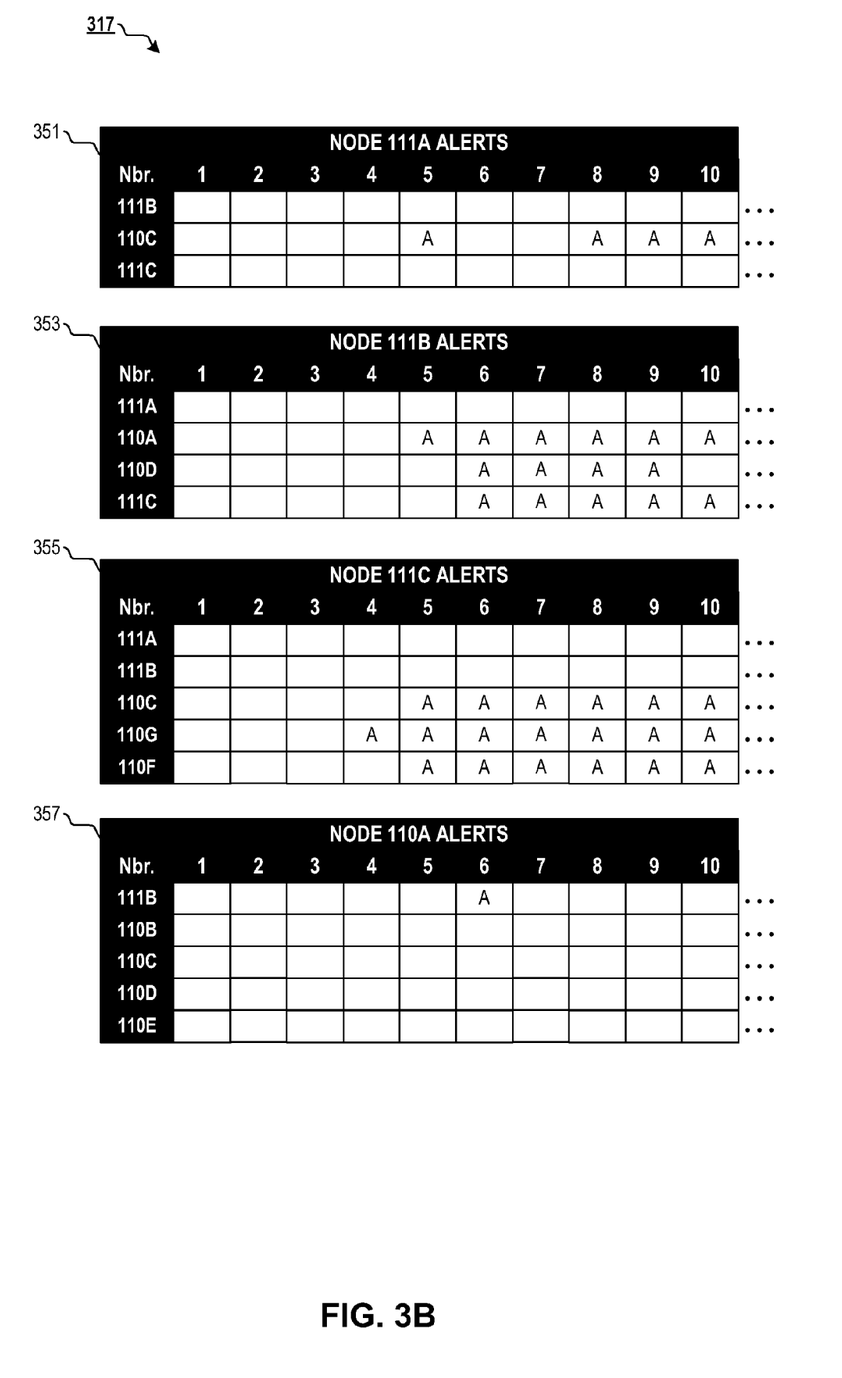
FIG. 3B illustrates exemplary data structures used in the central controller.

FIG. 3B illustrates tables of failure alerts received by central controller 120 from some nodes 110 regarding nodes 111A, 111B, 111C and 110A, for example. When central controller 120 receives a failure alert from one of nodes 110, the central controller 120 logs the alert in association with a period. The period may be the time at which a node 110 sent the failure alert. In other cases, the period is a time at which central controller 120 received the alert.

Because in some embodiments, failure alerts can be sent asynchronously, central controller 120 may store the received alerts in time bands. For instance, time bands may be set in five-second increments and any failure alert received from a node 110 within that increment will be logged in association with the increment. In other instances, failure alerts may be logged as received and central controller 120 will determine if a node 110 has failed based on the number of failure alerts received within a moving-time window (e.g., the most recent 30 seconds).

Based on notification policies 323 stored in memory device 315, central controller 120 may determine whether one of nodes 110 is considered to have failed and, when it is determined a node 110 has failed, provide a failure notification causing a notification device 314 to indicate a failure. Notification device 314 can be any device located in, near, or remote from central computer that provides a visual and/or aural indication that a node in network 100 has failed.

A policy for determining that a node is likely to have failed may be based on whether a number of failure alerts received from nodes 110 and stored in the log satisfy certain rules. The policy may be dynamically selected from a set stored in policies 323. In some embodiments, a failure notification is generated when the information in the log indicates that a predetermined number of failure alerts have been logged from a predetermined number of nodes over a predefined time interval. The policy may account for different levels of confidence required in different network embodiments, topologies or conditions.

For instance, under normal network conditions, in which network 100 is not overtaxed and/or there is little interference, central controller 120 may generate a notification at a lower confidence level than in a situation where there is a high level of interference. The policies can be arranged to reflect the higher level of confidence in different situations. In other words, if network conditions are good, central controller 120 may generate a failure notification when a lower number of nodes and/or a smaller time interval in log 317 reflect a failure alert; for example, a single node over three time periods, such as shown in FIG. 3B, log 351. When network conditions are poor, central controller 120 may require a greater number of nodes and/or a larger time interval to have received a failure alert (e.g. three nodes over five time periods, such as shown in FIG. 3B, log 353.

Based on the failure alert log 317, central controller may determine whether a node 110 has failed. Central controller 120 may make the determination using one or more policies 323. For example, with reference to log 351 in FIG. 3B, central controller 120 may not determine that node 111A has failed looking at time-period 5, since a single failure alert was received from a single node 110C. However, as also shown in FIG. 3B, log 351 of failure alerts for node 111A during time periods 8-10, includes three consecutive alerts from node 110C. Because three alerts were received from a single node over three consecutive periods, central controller 120 may determine based on a policy that node 111A has failed. Similarly, log 353 for node 111B, at period 6, three nodes 110A, 110D and 111C have reported that node 111B is failed. Since three nodes have provided failure alerts in a single period, depending on the selected policy 323, central controller 120 may determine that node 111B has failed.

Figure 4:
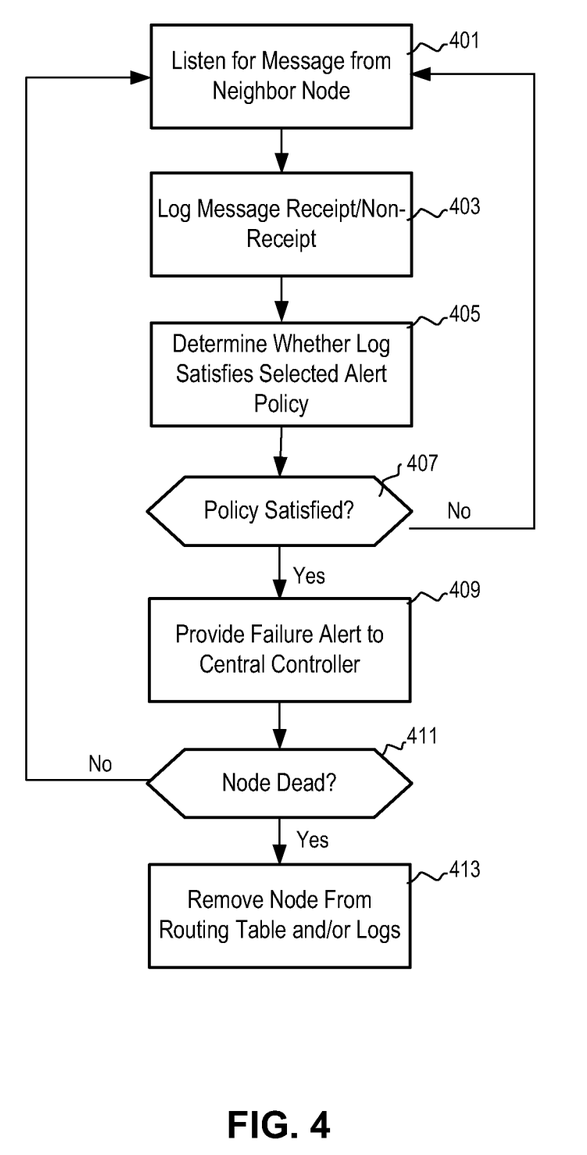
FIG. 4 is a process flow chart illustrating exemplary process steps performed by a node.

FIG. 4 illustrates a flowchart of an exemplary process performed by node 110F when CPU 201 executes failure module 220. Node 110F may listen for messages from its neighboring nodes, which are included in its neighbor table 219. (S. 401.) As shown in FIG. 1, node 110F's neighbors include: 110C, 110G, 110K, 110L and 111C. Node 110F is aware of its neighbors based on neighbor table 219, which was populated, for example, during a discovery process by discovery module 216. In some cases, the messages from other nodes occur periodically. In other cases, messages are scheduled by the other nodes in, for example, a frequency-hopping, spread spectrum communication protocol. Node 110F records in log 217 whether an expected message was actually received from each of nodes 110C, 110F, 110G, 110K, 110L and 111C within the scheduled time range. (S. 403.) Based on log 217, node 110F determines whether nodes 110C, 110G, 110K, 110L and 111C have satisfied a selected one of policies 223, which defines a predetermined number of messages that must be received by node 110F from each of its neighbors over predefined number of time periods. (S. 405.) If the policy is not satisfied, the node 110F continues to listen and log messages from its neighbors. (S. 407, "No.") If the policy is satisfied for one of said neighbors (S. 407, "Yes"), node 110F provides a failure alert to central controller 120 (S. 409).

Figure 5:
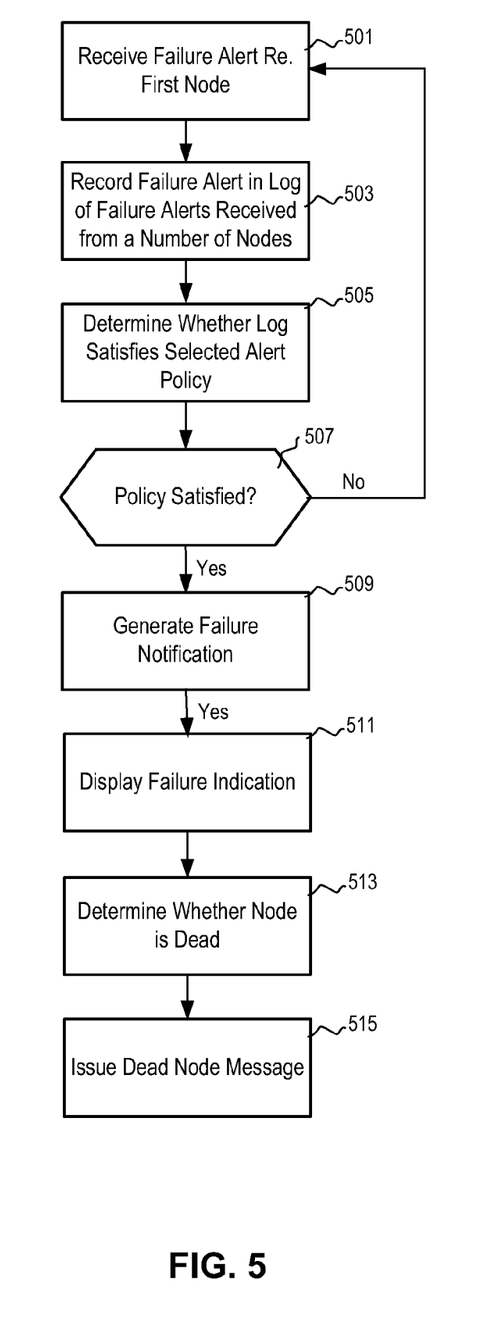
FIG. 5 is a process flow chart illustrating exemplary process steps performed by a central controller.

FIG. 5 illustrates a flowchart of an exemplary process performed by central controller 120, when CPU 301 executes notification module 320. Central controller 120 receives failure alerts provided by node 110F. (S. 501.) The failure alert received from node 110F is recorded in an alert log 317 along with alerts received from other nodes 110. (S. 503.) Based on a set of failure alerts recorded in log 317, which includes failure alerts received from a number of nodes 110 in network 100 (e.g., node 110C, node 110A and node 110D), central controller 120 determines whether the information stored in log 317 satisfies a predetermined policy 323. (S. 507.) In some embodiments, the policy may be dynamically selected from a set of policies 323 stored in memory device 315. If the policy is not satisfied, the central controller 120 continues to log failure alert messages received from nodes 110. (S. 507, "No.") If the policy is satisfied (S. 507, "Yes"), central controller 120 generates a failure notification causing notification device 314 to indicate a failure.

It should be noted that, central controller 120 may also act as a node within network 130. As such, in addition to the elements and functions of central controller 120 described above, central controller 120 may also include elements and perform the functions of a node 110 as discussed with reference to FIGS. 2A, 2B and 4. Thus, for example, central controller 120 may monitor messages from neighboring nodes, such as nodes 110K, 110L, 110M and 110N, and determine when these nodes fail in the same manner in a node 110.

As disclosed herein, embodiments and features of the invention can be implemented through computer hardware and/or software. While illustrative embodiments of the invention have been described herein, further embodiments can include equivalent elements, modifications, omissions, combinations (e.g., of aspects across various embodiments), adaptations and/or alterations as would be appreciated by those in the art based on the present disclosure. Other embodiments of the invention will be apparent to those skilled in the art from consideration of the specification and practice of the embodiments of the invention disclosed herein. Further, the steps of the disclosed methods can be modified in various manners, including by reordering steps and/or inserting or deleting steps, without departing from the principles of the invention. It is therefore intended that the specification and embodiments be considered as exemplary only.

What is claimed is:

1. A central controller that detects device failures in a network, said network including a plurality of nodes coupled to the central controller, wherein a first of said nodes communicates with the central controller via a second of said nodes, said central controller having a processor that executes program instructions stored in a memory device that cause the central controller to:

record a failure alert received from the second node in a log stored on the memory device, said second node providing said failure alert based on a determination that the first node has not transmitted a predetermined number of messages over a predefined number of time periods;

determine, by the processor, that the first node has failed based on a set of failure alerts recorded in the log, said set including failure alerts received from a plurality of nodes; and generate, when the processor determines that the first node has failed, a failure notification causing a notification device to indicate a failure.

2. The central controller of claim 1, wherein the network is a grid network and messages transmitted from the first node to the central controller are relayed to the central controller through a subset of the plurality of neighboring nodes that lie in one or more predetermined routes through the grid network to the central controller.

3. The central controller of claim 1, wherein the failure alert is generated by the second node after the second node fails to receive a periodic communication from the first node.

4. The central controller of claim 3, wherein the periodic communication is a message broadcast by the first node at a scheduled frequency and time.

5. The central controller of claim 4, wherein the broadcast message is a beaconing message.

6. The central controller of claim 1, wherein the first node is determined to have failed when the log includes a predetermined number of alerts received from a predetermined number of nodes within a predetermined period of time.

7. The central controller of claim 1, wherein the processor determines whether the first node has failed based on one or more policies.

8. The central controller of claim 7, wherein the processor determines whether the first node has failed based on a policy selected from a plurality of policies, said policy being dynamically selected by the processor based on the current condition of the network.

9. The central controller of claim 1, wherein the failed node is removed from the log.

10. The system of claim 1, wherein the processor of the central executes the program instructions to cause the central controller to:
receive a failure alert from at least one third node;
record the failure alert received from the at least one third node in the log in association with the failure alert receive from the second node; and
determine that the first node has failed by determining a number of failure alerts for the first node received from the second node in relation to the a number of failure alerts received from the at least one third node.

11. A central controller that detects device failures in a network, said network including a plurality of nodes coupled to the central controller, wherein a first of said nodes communicates with the central controller via a second of said nodes, said central controller having a processor that executes program instructions stored in a memory device that cause the central controller to:
record a failure alert received from the second node in a log stored on the memory device, said second node providing said failure alert based on a determination that the first node has not transmitted a predetermined number of messages over a predefined number of time periods;
determine, by the processor, that the first node has failed based on a set of failure alerts recorded in the log, said set including failure alerts received from a plurality of nodes; and
generate, when the processor determines that the first node has failed, a failure notification causing a notification device to indicate a failure,
wherein only a node that is a direct neighbor of the first node and resides along one of a plurality of routes to the central controller provides failure alerts regarding the first node.

12. A method for a central controller to detect device failures in a network comprised of a plurality of communicatively-coupled network nodes, wherein a first node communicates with the central controller via a second node that is in communication with the central controller, said method comprising:
recording a failure alert received from the second node in a log stored on the memory device, said second node providing said failure alert based on a determination that the first node has not transmitted a predetermined number of messages over a predefined number of time periods;
determining, by the processor, that the first node has failed based on a set of failure alerts recorded in the log, said set including failure alerts received from a plurality of nodes; and
generating, when the processor determines that the first node has failed, a failure notification causing a notification device to indicate a failure.

13. The method of claim 12, wherein the network is a grid network and messages transmitted from the first node to the central controller are relayed to the central controller through a subset of the plurality of neighboring nodes that lie in one or more predetermined routes through the grid network to the central controller.

14. The method of claim 12, wherein the failure alert is generated by the second node after the second node fails to receive a periodic communication from the first node.

15. The method of claim 14, wherein the periodic communication is a message broadcast by the first node at a scheduled frequency and time.

16. The method of claim 15, wherein the broadcast message is a beaconing message.

17. The method of claim 12, wherein the first node is determined to have failed when the log includes a predetermined number of alerts received from a predetermined number of nodes within a predetermined period of time.

18. The method of claim 12, wherein the processor determines whether the first node has failed based on one or more policies.

19. The method of claim 18, wherein the processor determines whether the first node has failed based on a policy selected from a plurality of policies, said policy being dynamically selected by the processor based on the current condition of the network.

20. The system of claim 12, wherein the failed node is removed from the log.

21. The method of claim 12, comprising:
receiving a failure alert from at least one third node;
recording the failure alert received from the at least one third node in the log in association with the failure alert receive from the second node; and
determining that the first node has failed by determining a number of failure alerts for the first node received from the second node in relation to a number of failure alerts received from the at least one third node.

22. A method for a central controller to detect device failures in a network comprised of a plurality of communicatively-coupled network nodes, wherein a first node communicates with the central controller via a second node that is in communication with the central controller, said method comprising:
recording a failure alert received from the second node in a log stored on the memory device, said second node providing said failure alert based on a determination that the first node has not transmitted a predetermined number of messages over a predefined number of time periods;

determining, by the processor, that the first node has failed based on a set of failure alerts recorded in the log, said set including failure alerts received from a plurality of nodes; and generating, when the processor determines that the first node has failed, a failure notification causing a notification device to indicate a failure, wherein only a node that is a direct neighbor of the first node and resides along one of said routes provides failure alerts regarding the first node.

23. A system for detecting device failures in nodes communicatively-coupled in a network, wherein a first of said nodes comprises a processor and a memory device, said memory device including data and computer-readable instructions that, when executed by the processor, cause the first node to:

record in a log stored on the memory device the time that messages are received from a second of the plurality of nodes that is a direct neighbor of the first node;

determine, based on said log, that the second node has not transmitted a predetermined number of messages over a predefined number of time periods; and provide, based on said determination, a failure alert to a central controller, wherein the central controller in communication with the first node is configured to determine whether the second node has failed based on the failure alert provided by the first node.

24. The system of claim 23, wherein the network is a grid network and messages transmitted from the second node to the central controller are relayed to the central controller through a subset of neighboring nodes that lie in one or more predetermined routes through the grid network to the central controller.

25. The system of claim 24, wherein only a node that is a direct neighbor of the second node and resides along one of said routes provides failure alerts regarding the second node.

26. The system of claim 23, wherein the failure alert is generated by the first node after the first node fails to receive a periodic communication from the second node.

27. The system of claim 26, wherein the periodic communication is a message broadcast by the second node at a scheduled frequency and time.

28. The system of claim 27, wherein the broadcast message is a beaconing message.

29. The system of claim 23, wherein the second node is determined to have failed by the central controller when a predetermined number of failure alerts are received from a predetermined number of nodes within a predetermined period of time.

30. The system of claim 23, wherein the processor determines whether to provide a failure alert to the central controller based on one or more policies.

31. The system of claim 30, wherein the processor determines whether to provide a failure alert to the central controller based on a policy selected from a plurality of policies, said policy being dynamically selected by the processor based on the current condition of the network.

32. The system of claim 23, wherein the first node is configured to:

record in the log, in association with the time that messages are received from the second node, the time that messages are received from at least one third node of the plurality of nodes, and determine, based on the log, that the second node has not transmitted a predetermined number of messages over the predetermined number of time periods, wherein the predetermined number of messages are based on the number of messages received from the at least one third node over the predefined number of time periods; and provide, based on the determination, the failure alert to the central controller when it is determined that the second node has not transmitted the predetermined number of messages in relation to the number of messages received from the at least one third node over the predefined number of time periods.

33. A system for detecting device failures in nodes communicatively-coupled in a network, wherein a first of said nodes comprises a processor and a memory device, said memory device including data and computer-readable instructions that, when executed by the processor, cause the first node to:

record in a log stored on the memory device the time that messages are received from a second of the plurality of nodes that is a direct neighbor of the first node;

determine, based on said log, that the second node has not transmitted a predetermined number of messages over a predefined number of time periods; and provide, based on said determination, a failure alert to a central controller, wherein the second node is removed from the log.

34. A method for detecting device failures in nodes communicatively-coupled in a network, wherein a first of said nodes comprises a processor and a memory device, said memory device including data and computer-readable instructions that, when executed by the processor, cause the first node to:

record in a log stored on the memory device the time that messages are received from a second of the nodes that is a direct neighbor of the first node;

determine, based on said log, that the second node has not transmitted a predetermined number of messages over a predefined number of time periods; and provide, based on said determination, a failure alert to a central controller, wherein the central controller in communication with the first node determines whether the second node has failed based on the failure alert provided by the first node.

35. The method of claim 34, wherein the network is a grid network and messages transmitted from the second node to the central controller are relayed to the central controller through a subset of neighboring nodes that lie in one or more predetermined routes through the grid network to the central controller.

36. The method of claim 35, wherein only a node that is a direct neighbor of the second node and resides along one of said routes provides failure alerts regarding the second node.

37. The method of claim 34, wherein the failure alert is generated by the first node after the first node fails to receive a periodic communication from the second node.

38. The method of claim 37, wherein the periodic communication is a message broadcast by the second node at a scheduled frequency and time.

39. The method of claim 38, wherein the broadcast message is a beaconing message.

40. The method of claim 34, wherein the second node is determined to have failed by the central controller when a predetermined number of failure alerts are received from a predetermined number of nodes within a predetermined period of time.

41. The method of claim 34, wherein the processor determines whether to provide a failure alert to the central controller based on one or more policies.

42. The method of claim 41, wherein the processor determines whether to provide a failure alert to the central controller based on a policy selected from a plurality of policies, said policy being dynamically selected by the processor based on the current condition of the network.

43. The method of claim 34, wherein the second node is removed from the log.

44. The method of claim 34, wherein the processor causes the first node to:
- record in the log, in association with the time that messages are received from the second node, the time that messages are received from at least one third node of the plurality of nodes, and
- determine, based on the log, that the second node has not transmitted a predetermined number of messages over the predetermined number of time periods, wherein the predetermined number of messages are based on the number of messages received from the at least one third node over the predefined number of time periods; and
- provide, based on the determination, the failure alert to the central controller when it is determined that the second node has not transmitted the predetermined number of messages in relation to the number of messages received from the at least one third node over the predefined number of time periods.

* * * * *